(No Model.)

G. S. BLACK.
SAW TOOTH SWAGE.

No. 323,628. Patented Aug. 4, 1885.

WITNESSES:
Fred E. Tasker.
A. R. Brown.

INVENTOR:
George S. Black
per J. C. Tasker atty

UNITED STATES PATENT OFFICE.

GEORGE S. BLACK, OF INDIANAPOLIS, INDIANA, ASSIGNOR TO E. C. ATKINS & CO., OF SAME PLACE.

SAW-TOOTH SWAGE.

SPECIFICATION forming part of Letters Patent No. 323,628, dated August 4, 1885.

Application filed March 7, 1885. (No model.)

*To all whom it may concern:*

Be it known that I, GEORGE S. BLACK, a citizen of the United States, residing at Indianapolis, in the county of Marion and State of Indiana, have invented certain new and useful Improvements in Saw-Tooth Swages; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a new and useful improvement in saw-tooth swages for spreading and sharpening the teeth of saws; and it consists of a swage made in three parts—viz., a shank or handle, a wedging center piece, and an adjustable collar, all related and arranged as hereinafter more fully described.

Figure 2:
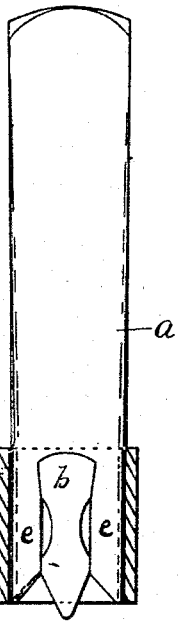
Figure 3:
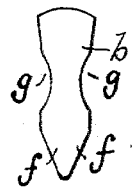
Figure 1:
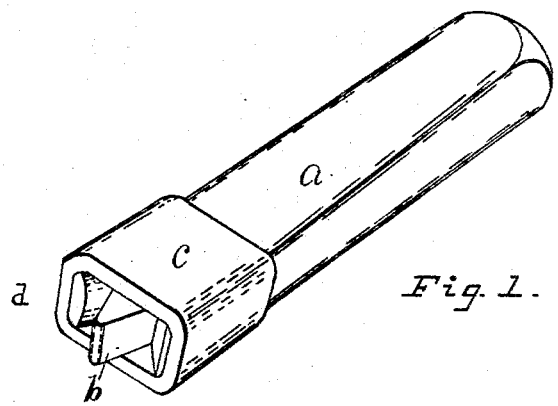

In the annexed drawings, illustrating my invention, Figure 1 is a perspective view of the swage. Fig. 2 is a vertical section, and Fig. 3 is a view of the tapering center piece or wedge.

Like letters of reference designate like parts in the several views.

$a$ represents the handle or shank of the swage, made of best tool steel, having its end slotted to receive the tapering center piece $b$. This slot is made tapering outwardly toward the end of the shank, and by cutting it the two jaws $e\ e$ are formed. The ends of these jaws, either one or both of them, are tapered and rounded on the inner side to form round faces $d$ for the dies. The wedge $b$ (shown in Fig. 3) tapers to its point, and may therefore be easily kept in place within the slot of the shank while the band $c$ is being driven into position. The two faces $f$ of the point of the wedge are made perfectly plain to serve as the straight faces of the dies. This point is also made of best tool-steel and hardened by some suitable process in order to make it hard enough to be used for the work intended. On both sides of the wedge are cut curved recesses $g\ g$. These may be longer or shorter, as desired; but they are preferably made to extend about half the length of the wedge. A wedge constructed of this form has many advantages over a wedge whose sides are straight throughout, for the jaws $e\ e$ will bind more firmly against the wedge by reason of the curved recesses when the band $c$ is driven into place, and firmer and better joints made at the junction of the faces of the dies.

In constructing this swage I first place the wedge $b$ within the slot. This must be done from the side, as the taper does not allow its insertion from the end. Then after these parts of the swage have been arranged, the collar $c$ is driven over the end of the swage, and the jaws $e\ e$ are thus clamped tightly against the wedge $b$, and two dies are formed by the straight faces of the wedge and the rounded faces of the jaws of the shank.

Having thus described my invention, what I claim as new, and desire to secure by Letters Patent, is—

A saw-tooth swage consisting of a shank, $a$, having jaws $e\ e$, rounded inwardly at their extremities, a wedge, $b$, tapering toward its point and provided with curved recesses $g\ g$ on both sides, and a clamping-band, $c$, substantially as and for the purpose described.

In testimony whereof I affix my signature in presence of two witnesses.

GEORGE S. BLACK.

Witnesses:
E. W. BRADFORD,
CHARLES L. THURBER.